(No Model.)

J. C. BOYD
SULKY.

No. 264,615. Patented Sept. 19, 1882.

WITNESSES:

INVENTOR:
J. C. Boyd
BY
ATTORNEYS.

UNITED STATES PATENT OFFICE.

JESSE C. BOYD, OF RUSHVILLE, INDIANA.

SULKY.

SPECIFICATION forming part of Letters Patent No. 264,615, dated September 19, 1882.

Application filed May 13, 1882. (No model.)

*To all whom it may concern:*

Be it known that I, JESSE C. BOYD, of Rushville, in the county of Rush and State of Indiana, have invented a new and useful Improvement in Vehicles, of which the following is a full, clear, and exact description.

The object of my invention is to provide an easy-riding seat for two-wheeled vehicles, and to remove the weight from the shafts.

To that end my invention consists in a seat provided with arms connected to the shafts by clips, and having C-springs interposed between the seat and axle, as hereinafter more fully set forth.

Reference is to be had to the accompanying drawings, forming a part of this specification, in which similar letters of reference indicate corresponding parts in both the figures.

Figure 1:
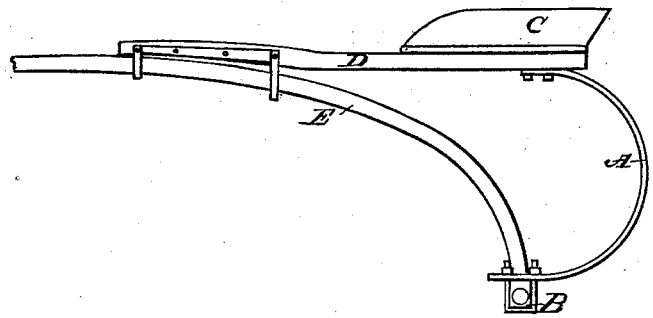
Figure 2:
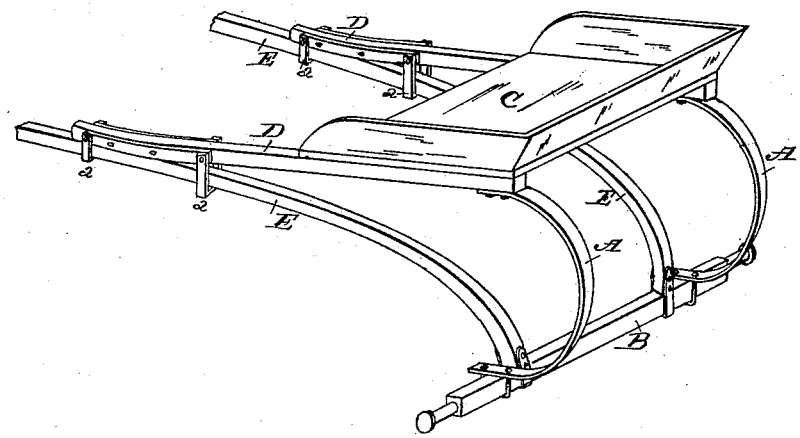

Figure 1 is a side view, showing my improved spring as applied to a wagon. Fig. 2 is a perspective view of the same.

B is the axle of an ordinary two-wheeled vehicle. C is the seat, and A A are the seat-springs. D D are arms connected to the shafts E by clips $a$ to allow the arms to move upon the shafts. The springs A are of C form, attached at one end directly to the axle and at their upper end to the supporting-bars D of the seat. The springs may be fitted at either end with a knuckle or joint. These springs make the seat easy riding, and it will be seen that the axle of the vehicle takes the weight directly, so that there is little or no weight upon the shafts.

I am aware that a vehicle-seat has heretofore been supported by two pairs of C-springs, one pair of which is interposed between the axle and seat and the other between the seat and shafts and jointed thereto, and I therefore lay no claim to such construction. In my invention I dispense with the forward pair of jointed springs, and employ in lieu thereof arms connected with the shafts by clips, and adapted to slide thereon in the movements of the seats and act as stops thereto, and thereby form a different, cheaper, and simpler construction, and are less liable to get out of order than that disclaimed.

Having thus described my invention, I claim as new and desire to secure by Letters Patent—

The combination, with the axle B and the curved shafts E, of the seat C, provided with the arms D, connected to the shafts by the clips $a$ and adapted to slide thereon, and the springs A, having one end secured to the axle and the opposite end to the rear ends of arms D, substantially as and for the purpose set forth.

JESSE C. BOYD.

Witnesses:
JOHN FRAIZER,
WILLIAM M. BOYD.